United States Patent
Saruwatari et al.

(10) Patent No.: US 8,034,487 B2
(45) Date of Patent: Oct. 11, 2011

(54) ELECTRODE FOR NON-AQUEOUS ELECTROLYTE BATTERY AND NON-AQUEOUS ELECTROLYTE BATTERY

(75) Inventors: Hidesato Saruwatari, Kawasaki (JP); Hideaki Morishima, Saku (JP); Hiroki Inagaki, Kawasaki (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 702 days.

(21) Appl. No.: 12/170,727

(22) Filed: Jul. 10, 2008

(65) Prior Publication Data
US 2009/0017381 A1   Jan. 15, 2009

(30) Foreign Application Priority Data

Jul. 12, 2007   (JP) .................................. 2007-183565
Jul. 8, 2008    (JP) ................................. 2008-177521

(51) Int. Cl.
*H01M 4/62* (2006.01)
(52) U.S. Cl. ...................... 429/232; 429/209
(58) Field of Classification Search .......................... None
See application file for complete search history.

(56) References Cited

U.S. PATENT DOCUMENTS

| | | | |
|---|---|---|---|
| 6,406,817 B2 * | 6/2002 | Wariishi et al. | 429/314 |
| 2005/0221188 A1 | 10/2005 | Takami et al. | |

FOREIGN PATENT DOCUMENTS

| | | |
|---|---|---|
| JP | 2000-277393 | 10/2000 |
| JP | 2002-83601 | 3/2002 |
| JP | 2006-286427 | 10/2006 |

OTHER PUBLICATIONS

Office Action issued Sep. 18, 2009, in Chinese Patent Application No. 200810136076.1 (with English translation).

* cited by examiner

*Primary Examiner* — Cynthia Lee
(74) *Attorney, Agent, or Firm* — Oblon, Spivak, McClelland, Maier & Neustadt, L.L.P.

(57) ABSTRACT

An electrode for a non-aqueous electrolyte battery includes a current collector formed of aluminum foil or aluminum alloy foil, and an active material-containing layer formed on a surface of the current collector and containing an active material, a conductive agent and a binder. The conductive agent comprises a carbon particle group containing first carbon particles each exhibiting an aspect ratio of more than one. A portion of each of the first carbon particles is embedded into the current collector to the depth corresponding to 20 to 50% of the thickness of the current collector. A major axis of each of the first carbon particles has a length of 1.05 to 1.50 times as large as the thickness of the active material-containing layer.

20 Claims, 3 Drawing Sheets

ELECTRODE FOR NON-AQUEOUS ELECTROLYTE BATTERY AND NON-AQUEOUS ELECTROLYTE BATTERY

CROSS-REFERENCE TO RELATED APPLICATIONS

This application is based upon and claims the benefit of priority from prior Japanese Patent Applications No. 2007-183565, filed Jul. 12, 2007; and No. 2008-177521, filed Jul. 8, 2008, the entire contents of both of which are incorporated herein by reference.

BACKGROUND OF THE INVENTION

1. Field of the Invention

This invention relates to an electrode for a non-aqueous electrolyte battery and to a non-aqueous electrolyte battery.

2. Description of the Related Art

In the case of the non-aqueous electrolyte battery of high-output where a large electric current is intended to be obtained, it is required to minimize the internal resistance of the electrode which is constituted by a current collector and an active material-containing layer. For example, there is disclosed an electrode in JP-A 2006-286427 (KOKAI) wherein the electrode is constructed such that a plurality of current collectors are arranged in an active material-containing layer to thereby minimize a maximum distance between the current collectors and the active material-containing layer. According to this electrode, it is possible to expect a reduction of the diffusion resistance inside the active material-containing layer. However, this electrode is accompanied with a problem that it is difficult to realize a reduction of the interface resistance between the active material-containing layer and the current collectors, i.e. another factor of the internal resistance of the electrode. This interface resistance becomes prominent in a case where a metal which is prone to form a strong oxide film on the surface thereof, such as aluminum, is to be employed as a current collector.

Further, there is disclosed an electrode in JP-A 2000-277393 (KOKAI) wherein a conductive layer which is low in electric resistance is interposed between the current collectors and the active material-containing layer. According to this electrode, it is possible to expect a reduction of the aforementioned interface resistance. However, this electrode is accompanied with a problem that it is difficult to realize a reduction of the aforementioned diffusion resistance.

Moreover, the electrodes described in the aforementioned publications, i.e. JP-A 2006-286427 (KOKAI) and JP-A 2000-277393 (KOKAI), are all designed to newly introduce into the active material-containing layer a plurality of current collectors or a component which does not contribute to the power generation, such as a conductive layer. As a result, a non-aqueous electrolyte battery provided with such electrodes is liable to be low in energy density relative to the volume thereof.

BRIEF SUMMARY OF THE INVENTION

According to a first aspect of the present invention, there is provided an electrode for a non-aqueous electrolyte battery, comprising:

a current collector formed of aluminum foil or aluminum alloy foil; and an active material-containing layer formed on a surface of the current collector and containing an active material, a conductive agent and a binder, wherein the conductive agent comprises a carbon particle group containing first carbon particles each exhibiting an aspect ratio of more than one, a portion of each of the first carbon particles is embedded into the current collector to the depth corresponding to 20 to 50% of the thickness of the current collector, and a major axis of each of the first carbon particles has a length of 1.05 to 1.50 times as large as the thickness of the active material-containing layer.

According to a second aspect of the present invention, there is provided a non-aqueous electrolyte battery which comprises a positive electrode and a negative electrode, at least one selected from the group consisting of the positive electrode and the negative electrode being the aforementioned electrode for a non-aqueous electrolyte battery.

DETAILED DESCRIPTION OF THE INVENTION

Next, an electrode for a non-aqueous electrolyte battery and a non-aqueous electrolyte battery representing an embodiment of the present invention will be explained in detail.

The electrode for the non-aqueous electrolyte battery according to an embodiment comprises a current collector formed of aluminum foil or aluminum alloy foil, and an active material-containing layer formed on one or opposite surfaces of the current collector and containing an active material, a conductive agent and a binder. The conductive agent comprises a carbon particle group containing first carbon particles each exhibiting an aspect ratio of more than one. A portion of each of first carbon particles extending in the major axial direction is embedded into the current collector to the depth corresponding to 20 to 50% of the thickness of the current collector. A major axis of each of first carbon particles has a length of 1.05 to 1.50 times as large as the thickness of the active material-containing layer. These first carbon particles can be embedded into the current collector, for example, by the step of press-forming an active material layer on the current collector. In the step, the portion of each of first carbon particles is applied with a force such that the portion of each of the first carbon particles penetrates the current collector.

Herein, the thickness of the active material-containing layer means a thickness of the active material-containing layer which is formed on one side of the current collector.

The depth in which the portion of the first carbon particle is embedded into the current collector can be confirmed by means of electron microscopic analysis. Namely, a cross-section of the electrode selected through random sampling is placed in the visual field of an electron microscope and it is examined if there is present any carbon particle whose the portion is embedded into the current collector to the depth corresponding to 20 to 50% of the thickness of the current collector, thereby confirming the depth of embedding of the first carbon particle.

The portion of the first carbon particle that is embedded into the current collector should preferably include one of the opposite ends of each of first carbon particles extending in the major axial direction. In this case, the first carbon particle is brought into a state where the first carbon particle is substantially erected relative to the current collector. This state of the first carbon particle is preferable for the purpose of enhancing the energy density per unit volume of the battery.

Herein, the major axial of the first carbon particle can be determined as follows. Namely, in the observation of a cross-section of the electrode by making use of an electron microscope, a circle minimal in diameter (a minimal circumscribed circle) that can envelope the first carbon particle among every circumscribed circles enveloping the first carbon particle is depicted. Further, every lines connecting two contact points (i.e. where the minimal circumscribed circle intersect with the border line of the first carbon particle) are depicted. Subsequently, the longest line among these lines is selected to determine the major axial of the first carbon particle.

This determination of the major axial of the first carbon particle will be explained with reference to FIG. 5. In this case, a circle "C" is the minimal circumscribed circle of the first carbon particle 101 having a flaky configuration. This circle "C" is contacted with the border line of the first carbon particle 101 at points P1-P3. Then, lines are depicted between the points P1 and P2, between the points P2 and P3 and between the points P3 and P1, thus determining the lengths L12, L23 and L31 of these lines. Among these lines in FIG. 5, the longest line is the line L12. Therefore, the major axial of the first carbon particle 101 shown in FIG. 5 is the line L12.

Further, the aspect ratio can be determined as follow. Namely, after the determination of the major axial of the first particle by means of the aforementioned method, the longest line among the lines orthogonally intersecting with the major axis and delimited by the border line of the first carbon particle is selected, thus determining the minor axis of the particle. Based on the minor axis and the major axis of the particle thus determined, the aspect ratio of the particle can be determined by the following equation.

*Aspect ratio=(major axis)/(minor axis)*

Figure 5:
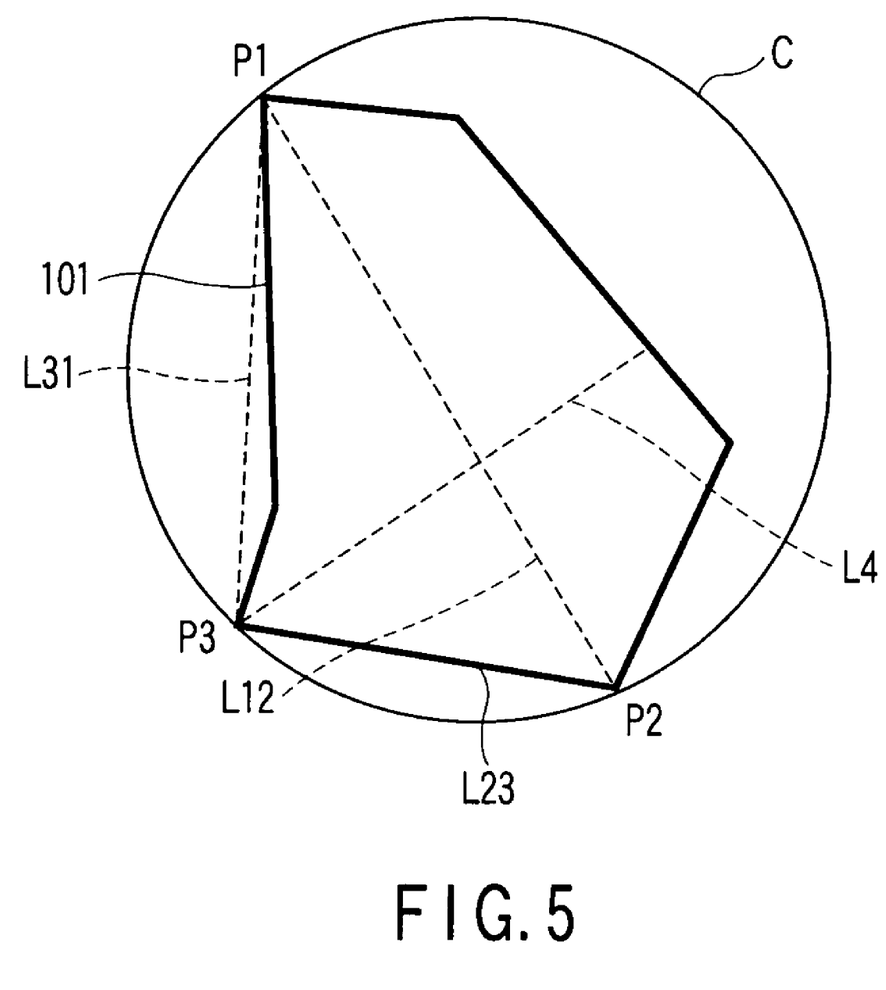
FIG. 5 is a diagram for describing a decision of a major axial of a first carbon particle.

In FIG. 5, the major axis is L12 and the minor axis is L4. Therefore, the aspect ratio of the particle can be determined from L12/L4.

The aspect ratio of the particle should preferably be more than 1, for example 1.5. When the aspect ratio is nearly one, the first carbon particle would become approximately spherical. If the first carbon particle is spherical, the energy density per unit volume of the battery would become very low. For this reason, it is required that the aspect ratio is more than one. On the other hand, if the aspect ratio of the first particle is more than 100, the first carbon particle would become too weak in mechanical strength. Therefore, when a prescribed pressure is applied to the first carbon particle in the step of press working, the structure of first carbon particle may be destroyed. When the structure of first carbon particle is destroyed, the conductive path would be cut off, thereby making it difficult to overcome the problems. Accordingly, the aspect ratio should be 1.5 to 100, more preferably to the range of 1.5 to 20.

The length of the major axis of the first carbon particle can be confirmed also by means of electron microscopic analysis. Namely, a cross-section of the electrode selected through random sampling is placed in the visual field of an electron microscope and it is examined if there is present any carbon particle whose one end extending in the major axial direction is embedded into the current collector to the depth corresponding to 20 to 50% of the thickness of the current collector and whose major axial length is 1.05 to 1.50 times as large as the thickness of the active material-containing layer, thereby confirming the length of the major axis of the first carbon particle.

The first carbon particle having the aspect ratio should preferably be formed of flaky carbon particle to be produced from graphite or coke. The first carbon particle is preferably a carbon particle having a network structure. When the carbon particle is constructed to have a network structure, even if a portion of the network structure is destroyed, the conductive path can be retained by other portions of the network structure.

If the depth of embedment of each of the first carbon particles in the current collector is less than 20% of the thickness of the current collector, the anchoring effect to be derived by the penetration of one axial end of the first carbon particle extending in the major axial direction, i.e. the effect of reducing the interfacial resistance between the current collector and the active material-containing layer cannot be sufficiently achieved. On the other hand, if the depth of embedment of the first carbon particle in the current collector exceeds 50% of the thickness of the current collector, the resistance of the current collector may be caused to increase concomitantly with the decrease in volume of the current collector at the embedded portion thereof. More preferably, the depth of embedment of the first carbon particle in the current collector is 20 to 40%. Herein the thickness of the current collector means an average thickness of the current collector carrying the active material-containing layer thereon. This average thickness can be determined by measuring 20 points of the current collector by making use of a micrometer and then by calculating the average value thereof.

If the length of the major axis of the first carbon particle is smaller than 1.05 times the thickness of the active material-containing layer in the case where the depth of embedment of the first carbon particle in the current collector is 20 to 40%, it may become difficult to obtain the effect of shortening the distance of conductive path as well as the effect of reducing the interfacial resistance between the current collector and the active material-containing layer. On the other hand, if the length of the major axis of the first carbon particle exceeds 1.50 times the thickness of the active material-containing layer in the case where the depth of embedment of the first carbon particle in the current collector is 20 to 40%, the first carbon particle may be brought into a state where the first carbon particle floats out of the surface of electrode (active material-containing layer) and hence a semi-short circuit is more likely to occur, thus possibly deteriorating the safety of the battery. More preferably, the length of the major axis of the first carbon particle is 1.10 to 1.45 times the thickness of the active material-containing layer.

In the state where the portion of the first carbon particle is embedded into the current collector, a portion located opposite to the portion of the first carbon particle (hereinafter referred to as the other portion) should preferably be located within a region defined by an intermediate portion in thickness-wise of the active material-containing layer and by the surface of the active material-containing layer. When this other portion of the carbon particle is positioned, in this manner, within a region bounded by an intermediate portion in thickness-wise of the active material-containing layer and by the surface of the active material-containing layer, the length of route of conductive path can be brought further close to the minimum distance between the active material and the current collector, thus making it possible to expect the effects of further minimizing the internal resistance.

Especially, it is preferable that the other portion of the first carbon particle is extended up to the surface of the active material-containing layer.

Herein, the term "extend up to" means that the other portion of the first carbon particle is located at the surface of the active material-containing layer (i.e. the surface of the active material-containing layer which is disposed opposite to the surface thereof contacted with the current collector).

In addition, when the first carbon particle in which the portion thereof is embedded into the current collector is disposed such that the other portion thereof is not extended up to the surface of the active material-containing layer (i.e. the surface of the active material-containing layer which is disposed opposite to the surface thereof contacted with the current collector), the other portion of the first carbon particle should preferably be positioned within a region defined by the surface of the active material-containing layer (excluding the surface of the active material-containing layer) and by a plane away from the surface of the active material-containing layer by a distance corresponding to an average particle diameter of the active material.

It is preferable that the number of the first carbon particle embedded into the current collector is $1\times10^3/m^2$ to $1\times10^8/m^2$ based on the electrode area. In this case, it is possible to enable the reaction to proceed quickly in any place within the active material-containing layer.

In a preferable embodiment, the portion of the first carbon particle is embedded into the current collector in such a manner that the number of the first carbon particle thus embedded into the current collector is $1\times10^3/m^2-1\times10^8/m^2$ based on the electrode area and that the other end portion of the first carbon particle is extended up to the surface of the active material-containing layer.

The conductive agent in a preferable form thereof is constituted by a composition comprising a carbon particle group having an aspect ratio of more than one, such as graphite or coke, and carbon powder such as carbon black and fibrous carbon which is finer in particle size than the first carbon particle. The carbon black is preferably acetylene black or kitchen black. The conductive agent should preferably contain 30 to 60% by weight of the carbon particle group, and 40 to 70% by weight of the carbon powder. The active material-containing layer containing a conductive agent constituted by the aforementioned composition is featured to exhibit not only the effect of minimizing the internal resistance as hereinafter explained but also a sufficient strength to withstand the winding, etc. on the occasion of manufacturing an electrode group.

It is preferable that the carbon particle group further comprises second carbon particles whose one end extending in the major axial direction is embedded into the current collector to the depth corresponding to less than 20% of the thickness of the current collector or is not embedded into the current collector. These second carbon particles may contain carbon particles having a similar major axis to that of the first carbon particles and having a length which is 1.05 to 1.50 times as large as the thickness of the active material-containing layer and also carbon particles whose major axis is shorter than that of the first carbon particles. In the carbon particle group contained the first carbon particles and the second carbon particles, the first carbon particles are preferably 10 to 80% by weight, more preferably 20 to 60 by weight.

The current collector formed of aluminum foil or aluminum alloy foil is preferably roughened in the surface thereof by means of etching, for instance. Since this surface-roughened current collector is enlarged in the area to be contacted with the active material-containing layer, the interfacial resistance can be minimized. However, the current collector formed of surface-roughened aluminum foil or surface-roughened aluminum alloy foil is accompanied, on the surface thereof, with a stronger oxide film as compared with the current collector which is not surface-roughened. For this reason, the interfacial resistance between the current collector and the active material-containing layer cannot be sufficiently minimized. In the case of the electrode according to this embodiment, the first carbon particles contained in the conductive agent and having an aspect ratio of more than one are respectively embedded into the current collector in such a manner that one of the opposite ends thereof extending in the major axial direction is embedded into the current collector to the depth corresponding to 20 to 50% of the thickness of the current collector, thus anchoring the carbon particles. Due to this anchoring effect, it is now possible to minimize the influence of the resistance by the oxide film, thereby making it possible to minimize the internal resistance.

The etching for roughening the surface of the current collector can be performed by means of a chemical etching method or electrolytic etching method. The electrolytic etching can be performed in such a manner that aluminum foil or aluminum alloy foil is dipped as an anode in an electrolytic bath containing chloride ion and heated to a temperature of 60 to 120° C. and then 20 to 1000V of DC or AC voltage is applied to the foil. As a result, the surface of foil can be roughened to such a degree that the surface of the foil increases in area by several times to about 120 times as compared with that of the smooth surface of foil. The magnification of surface-roughening of the foil can be calculated by measuring the electrostatic capacity of the aluminum foil or aluminum alloy foil. More specifically, the surface-roughened aluminum foil or aluminum alloy foil is sandwiched between metallic electrodes and then a voltage (V[V]) is applied to the foil. As a result, in proportion to the voltage applied, an electric charge (Q[C]) represented by the following formula (1) is accumulated in the foil.

$$Q=CV \quad (1)$$

Wherein C[F] represents an electrostatic capacity. This electrostatic capacity "C" can be represented by an electrode area "S", an inter-electrode distance "t", a specific inductive capacity of dielectric material "ξ" (7 to 8 in the case of aluminum oxide film) and the permittivity of vacuum "$\xi_0$" ($=8.85\times10^{-12}$) as indicated by the following formula (2).

$$\xi_0 \cdot \xi \cdot (S/t) \quad (2)$$

The magnification of surface-roughening can be calculated by dividing the electrode area "S" that has been derived from the formula (2) by the area of smooth surface "s". The magnification of surface-roughening is preferably 10 to 120 times.

Figure 1:
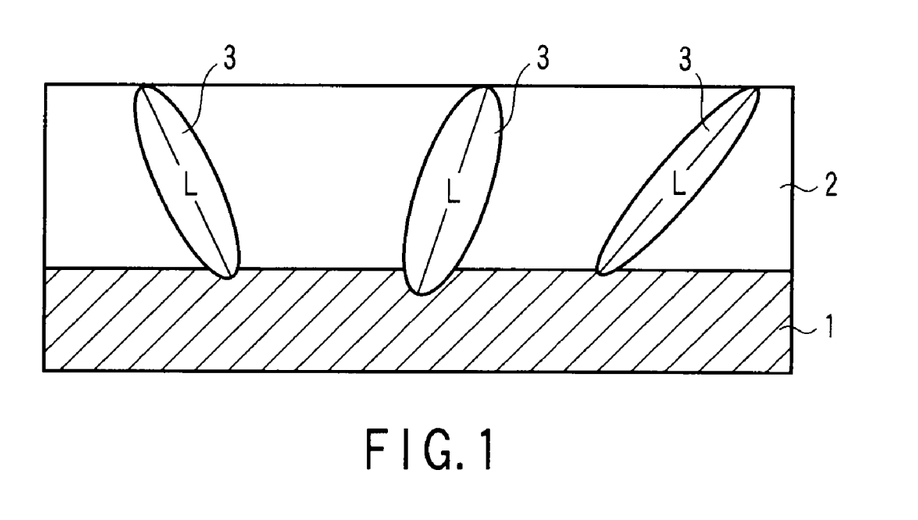
FIG. 1 is a cross-sectional view schematically illustrating the electrode according to an embodiment.
Figure 2:
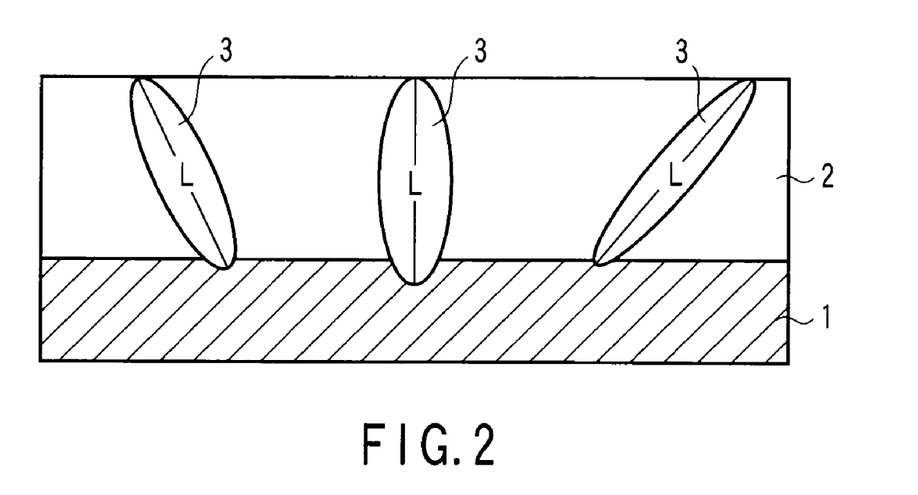
FIG. 2 is a cross-sectional view schematically illustrating the electrode according to an embodiment.

The construction of the electrode containing, as one of the components of the conductive agent, the first carbon particles each exhibiting an aspect ratio of more than one will be explained more specifically with reference to FIGS. 1 and 2, wherein one of the opposite ends of each first carbon particle extending in the major axial direction is embedded into the current collector to the depth corresponding to 20 to 50% of the thickness of the current collector and the length of the major axis of the first carbon particle is confined to 1.05 to 1.50 times as large as the thickness of the active material-containing layer. Referring to FIGS. 1 and 2, a current collector 1 formed of aluminum foil or aluminum alloy foil is laminated, on one side thereof, with an active material-containing layer 2 containing an active material, a conductive agent and a binder. The conductive agent constituting one component of the active material-containing layer 2 comprises a carbon particle group containing first carbon particles 3 each exhibiting an aspect ratio of more than one, wherein one of the opposite ends of each first carbon particle extending in the major axial direction is embedded into the current collector 1 to the depth corresponding to 20 to 50% of the thickness of the current collector 1. The first carbon particles 3 have respectively a major axis having a length "L" 1.05 to 1.50 times as large as the thickness of the active material-containing layer 2. The other end of the first carbon particle 3, which is located opposite to the end embedded into the current collector 1, is extended up to the surface of the active material-containing layer 2.

The non-aqueous electrolyte battery according to one embodiment is featured in that at least one selected from the group consisting of a positive electrode and a negative electrode is constituted by the aforementioned electrode for the non-aqueous electrolyte battery. Next, there will be explained in detail various states of the present invention, i.e. (1) a state where the aforementioned electrode for the non-aqueous electrolyte battery is applied to both of the positive electrode and the negative electrode; (2) a state where the aforementioned electrode for the non-aqueous electrolyte battery is applied only to the positive electrode; and (3) a state where the aforementioned electrode for the non-aqueous electrolyte battery is applied only to the negative electrode.

(1) A state where the aforementioned electrode for the non-aqueous electrolyte battery is applied to both of the positive electrode and the negative electrode:

<Positive Electrode>

The positive electrode is constituted by a current collector made of aluminum foil or aluminum alloy foil, and a positive electrode active material-containing layer which is carried on one or both surfaces of the current collector and containing an active material for positive electrode, a conductive agent (comprising the carbon particle group containing the first carbon particles having the aforementioned features) and a binder. This positive electrode can be manufactured as follows, for example. Namely, the conductive agent and the binder are added to the active material for positive electrode to obtain a mixture, and then the mixture is emulsified in a suitable solvent to obtain a slurry. The slurry is then coated on the current collector and dried. The resultant body is pressed to manufacture the positive electrode.

The aluminum foil or aluminum alloy foil used as the current collector is preferably constituted by crystal grains having an average grain diameter of not more than 50 μm, more preferably not more than 30 μm, most preferably not more than 5 μm. When the average grain diameter of crystal grains is confined to not more than 50 μm, it becomes possible to remarkably increase the mechanical strength of the aluminum foil or aluminum alloy foil. As a result, it is possible to enhance the density of the positive electrode active material-containing layer by increasing the pressure on the occasion of press molding, thereby making it possible to increase the positive electrode capacity.

The average grain diameter of crystal grains can be determined by the following method. Namely, the texture of the surface of the current collector is observed by making use of an optical microscope to thereby count the number (n) of crystal grains present in an area of 1 mm×1 mm. By making use of this number (n), an average crystal grain area "S" is determined according to the expression of: $S=1\times10^6/n(\mu m^2)$.

From the value of "S" thus obtained, an average grain diameter "d(μm)" of crystal grains is calculated according to the following formula (3).

$$D=2(S/n)^{1/2} \quad (3)$$

An average grain diameter of crystal grains of aluminum foil or aluminum alloy foil varies depending on a plurality of factors such as the texture of material, impurities, working conditions, heat treatment history and annealing conditions. The crystal grain diameter can be adjusted by suitably combining the aforementioned various factors in the process of manufacturing the current collector.

The thickness of aluminum foil or aluminum alloy foil is preferably 20 μm or less, more preferably 1.50 μm or less. Further, it is desirable that the aluminum foil has a purity of 99% or more. The aluminum alloys may preferably be selected from alloys containing magnesium, zinc, silicon. If aluminum alloys contains a transition metal such as iron, copper, nickel, chromium, the quantity thereof is preferably not more than 1% by weight.

These aluminum foil and aluminum alloy foil preferably has surface-roughened as described above.

The active material for positive electrode may be selected from the group consisting of, for example, manganese dioxide ($MnO_2$), iron oxide, copper oxide, nickel oxide, $Li_aMnO_2$, lithium nickel composite oxide (for example, $Li_aNiO_2$), lithium cobalt composite oxide (for example, $Li_aCoO_2$), lithium nickel cobalt composite oxide {for example, $LiNi_{1-e-f}Co_eM_fO_2$; wherein M is at least one element selected from the group consisting of Al, Cr and Fe; $0 \leq e \leq 0.5$, $0 \leq f \leq 0.1$}, lithium manganese cobalt composite oxide {for example, $LiMn_{1-g-h}Co_gM_hO_2$; wherein M is at least one element selected from the group consisting of Al, Cr and Fe; $0 \leq g \leq 0.5$, $0 \leq h \leq 0.1$}, lithium manganese nickel composite oxide {for example, $LiMn_jNi_jM_{1-2j}O_2$; wherein M is at least one element selected from the group consisting of Co, Cr, Al and Fe; $\frac{1}{3} \leq j \leq \frac{1}{2}$, $LiMn_{1/3}Ni_{1/3}Co_{1/3}O_2$, $LiMn_{1/2}Ni_{1/2}O_2$}, spinel type lithium manganese composite oxide ($Li_aMn_{2-b}M_bO_4$, wherein M is at least one element selected from the group consisting of Al, Cr, Ni and Fe), spinel type lithium manganese nickel composite oxide ($Li_aMn_{2-b}Ni_bO_4$), lithium phosphorus oxide having an olivine structure ($Li_aFePO_4$, $Li_aFe_{1-b}Mn_bPO_4$, $Li_aCoPO_4$, etc.), iron sulfate ($Fe_2(SO_4)_3$), and vanadium oxide (for example, $V_2O_5$). Herein, "a", "b" and "c" is preferably 0 to 1. The active material can be also used organic or inorganic materials such as conductive polymer materials such as polyaniline, polypyrrol; disulfide-based polymer materials; sulfur (S); carbon fluoride.

More preferable examples of the active material for positive electrode are lithium nickel composite oxide, lithium cobalt composite oxide, lithium nickel cobalt composite oxide, lithium manganese nickel composite oxide, spinel type lithium manganese composite oxide, spinel type lithium manganese nickel composite oxide, lithium manganese cobalt composite oxide, and lithium iron phosphate. According to these active materials for positive electrode, it can be obtained high voltage batteries. The spinel type lithium manganese composite oxide and the lithium iron phosphate are a more preferable due to have a high electric resistance itself.

The binder can be used, for example, polytetrafluoroethylene (PTFE), poly(vinylidene fluoride) (PVdF) and fluorinated rubber.

The mixing ratio of the active material, conductive agent and binder may preferably be set to 80 to 95% by weight of the active material, 3 to 20% by weight of the conductive agent, and 2 to 7% by weight of the binder.

<Negative Electrode>

The negative electrode is constituted by a current collector made of aluminum foil or aluminum alloy foil, and an active material-containing layer which is carried on one or both surfaces of the current collector and containing an active material for negative electrode, a conductive agent (comprising the carbon particle group containing the first carbon particles having the aforementioned features) and a binder. This negative electrode can be manufactured as follows, for example. Namely, the conductive agent and the binder are added to, for example, a powdery active material to obtain a mixture, and then the mixture is emulsified in a suitable solvent to obtain a slurry. The slurry is then coated on the current collector and dried. The resultant body is pressed to manufacture the negative electrode.

The aluminum foil or aluminum alloy foil used as the current collector is preferably constituted by crystal grains having an average grain diameter of not more than 50 μm, more preferably not more than 30 μm, most preferably not more than 5 μm. The average grain diameter of crystal grains can be determined according to the aforementioned method. When the average grain diameter of crystal grains is confined to not more than 50 μm, it becomes possible to remarkably increase the mechanical strength of the aluminum foil or aluminum alloy foil. As a result, it is now possible to enhance the density of the active material-containing layer by increasing the pressure on the occasion of press molding, thereby making it possible to increase the negative electrode capacity. Furthermore, it is also possible to prevent the dissolution and corrosive deterioration of the current collector during the over-discharging cycle under high-temperature environments (40° C. or more). As a result, it is possible to suppress the rise of negative electrode impedance. Additionally, it is also possible to enhance the output characteristics, quick charge and charge/discharge cycle characteristics of a battery.

The average grain diameter of crystal grains of aluminum foil or aluminum alloy foil varies depending on a plurality of factors such as the texture of material, impurities, working conditions, heat treatment history and annealing conditions. The crystal grain diameter can be adjusted by suitably combining the aforementioned various factors in the process of manufacturing the current collector.

The thickness of aluminum foil or aluminum alloy foil is preferably 20 μm or less, more preferably 1.50 μm or less. Further, it is desirable that the aluminum foil has a purity of 99% or more. The aluminum alloys may preferably be selected from alloys containing magnesium, zinc, silicon. If aluminum alloys contains a transition metal such as iron, copper, nickel, chromium. the quantity thereof should preferably be confined to not more than 1% by weight.

The aluminum foil and aluminum alloy foil preferably has surface-roughened as described above.

The active material for negative electrode can be used, for example, carbonaceous materials or metal compounds.

Examples of the carbonaceous materials are natural graphite, artificial graphite, coke, vapor-phase growth carbon fiber, mesophase pitch-based carbon fiber, spheroidal carbon, resin-sintered carbon. More preferable examples of the carbonaceous materials are vapor-phase growth carbon fiber, mesophase pitch-based carbon fiber and spheroidal carbon. The carbonaceous materials should preferably be selected from those whose spacing "$d_{002}$" of (002) plane is not more than 0.340 nm as measured by means of X-ray diffraction.

The metal compounds can be used, for example, metal oxide, metal sulfide or metal nitride.

Examples of the metal compounds are titanium-containing metal composite oxide, amorphous tin oxide such as $SnB_{0.4}P_{0.6}O_{3.1}$, tin silicon oxide such as $SnSiO_3$, silicon oxide such as SiO, and tungsten oxide such as $WO_3$. Among them, the use of titanium-containing metal composite oxide is more preferable. The titanium-containing metal composite oxide can be used, for example, ramsdellite type $Li_{2+f}Ti_3O_7$ ($-1 \leq f \leq 3$), and metallic composite oxides containing Ti and at least one element selected from the group consisting of P, V, Sn, Cu, Ni and Fe. Examples of aforementioned metallic composite oxides containing Ti and at least one element selected from the group consisting of P, V, Sn, Cu, Ni and Fe are $TiO_2$—$P_2O_5$, $TiO_2$—$V_2O_5$, $TiO_2$—$P_2O_5$—$SnO_2$, and $TiO_2$—$P_2O_5$-MeO (wherein Me is at least one kind of element selected from the group consisting of Cu, Ni and Fe). The metallic composite oxides are preferably selected from those having a microstructure which is low in crystallinity and constituted by a crystal phase coexisting with an amorphous phase or by only an amorphous phase. The metallic composite oxides having such a microstructure are effective in greatly enhancing the charge/discharge cycle characteristics. Among these metallic composite oxides, the use of lithium titanium oxide or metallic composite oxides containing Ti and at least one element selected from the group consisting of P, V, Sn, Cu, Ni and Fe is more preferable.

The metal sulfide can be used, for example, titanium sulfide such as $TiS_2$, molybdenum sulfide such as $MOS_2$, or iron sulfide such as FeS, $FeS_2$, $Li_xFeS_2$.

The metal nitride can be used, for example, lithium cobalt nitride (for example, $Li_sCo_tN$, 0<s<4, 0<s<4).

The spinel type lithium titanium oxide is a more preferable due to have a high electric resistance itself.

The binder can be used, for example, polytetrafluoroethylene (PTFE), poly(vinylidene fluoride), fluorinated rubber, styrene butadiene rubber.

The mixing ratio among the active material, the conductive agent and the binder is preferably 73 to 96 wt % of the active material, 2 to 20 wt % of the conductive agent, and 2 to 7 wt % of the binder.

(2) A state where the aforementioned electrode for the non-aqueous electrolyte battery is applied only to the positive electrode:

<Positive Electrode>

The positive electrode can be used those explained in the aforementioned paragraph (1).

<Negative Electrode>

The negative electrode is constituted by a current collector made of aluminum foil or aluminum alloy foil, and a negative electrode active material-containing layer which is carried on one or both surfaces of the current collector and containing an active material and a binder. This negative electrode can be manufactured as follows for example. Namely, the binder is added to, for example, powdery active material to obtain a mixture, and then the mixture is emulsified in a suitable solvent to obtain a slurry. The slurry is then coated on the current collector and dried. The resultant body is pressed to manufacture the negative electrode.

As for the current collector and the binder, those having the same kinds of materials as explained in the above paragraph (1) can be used.

The lithium alloy can be used, for example, lithium aluminum alloy, lithium zinc alloy, lithium magnesium alloy, lithium silicon alloy, lithium lead alloy. When lithium alloy foil is to be used, the lithium alloy foil can be used as it is for forming the negative electrode.

When the active material is to be used together with a conductive material, the same kinds of carbonaceous material or metal compounds as explained in the above paragraph (1) can be employed. This conductive material is different in features from the conductive material (containing the first carbon particles having the features) explained in the above paragraph (1) and can be selected from, for example, carbon black (preferably, acetylene black, kitchen black), graphite, coke, fibrous carbon.

The mixing ratio of these active material, conductive agent and binder is preferably set to 73 to 98% by weight of the active material, 0 to 20% by weight of the conductive agent, and 2 to 7% by weight of the binder.

(3) A state where the aforementioned electrode for the non-aqueous electrolyte battery is applied only to the negative electrode:

<Positive Electrode>

The positive electrode may be formed to have the same composition and construction as those explained in the above paragraph (1) except that a conductive agent which is different in features from the conductive material (containing the first carbon particles having the features as explained above) explained in the above paragraph (1) is used, specific examples of such a conductive agent being selected from, for example, carbon black (preferably, acetylene black, kitchen black), graphite, coke, fibrous carbon, etc.

<Negative Electrode>

The negative electrode can be used those explained in the aforementioned paragraph (1).

The non-aqueous electrolyte battery according to one embodiment should preferably be constructed such that the positive electrode and/or the negative electrode thereof is formed of the aforementioned electrode for a non-aqueous electrolyte battery and that the value to be obtained from the multiplication of battery resistance [mΩ] by battery capacity [Ah](i.e. (battery resistance) [mΩ]×(battery capacity) [Ah]) under the condition where the state of charge:SOC is 50% is less than 10 mΩAh.

If the value of (battery resistance) [mΩ]×(battery capacity) [Ah] is more than 10 mΩAh, it indicates that the component of resistance other than the electrode resistance is large and may become an obstacle in passing a large electric current on the occasion of large current charging/discharging, thereby possibly decreasing the output characteristics of the battery. Examples of the component of resistance other than the electrode resistance include separator resistance, the resistance of the current collector and of the portion from which electric current is taken out, the resistance of the non-aqueous electrolyte, the interfacial resistance between the current collector and the active material, and the resistance that can be ascribed to the inter-layer distance between the positive electrode and the negative electrode.

Figure 3:
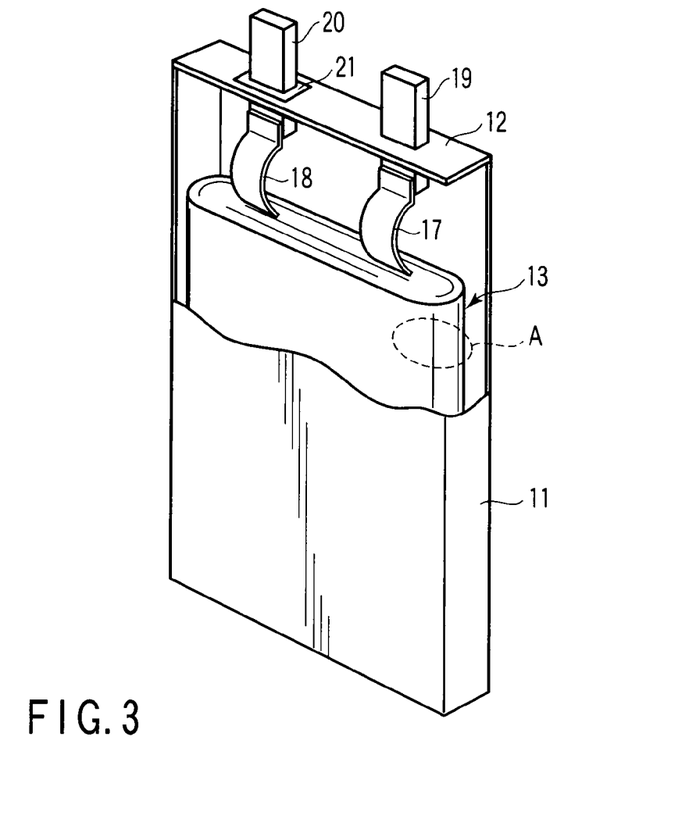
FIG. 3 is a partial cross-sectional view illustrating the non-aqueous electrolyte battery according to an embodiment.
Figure 4:
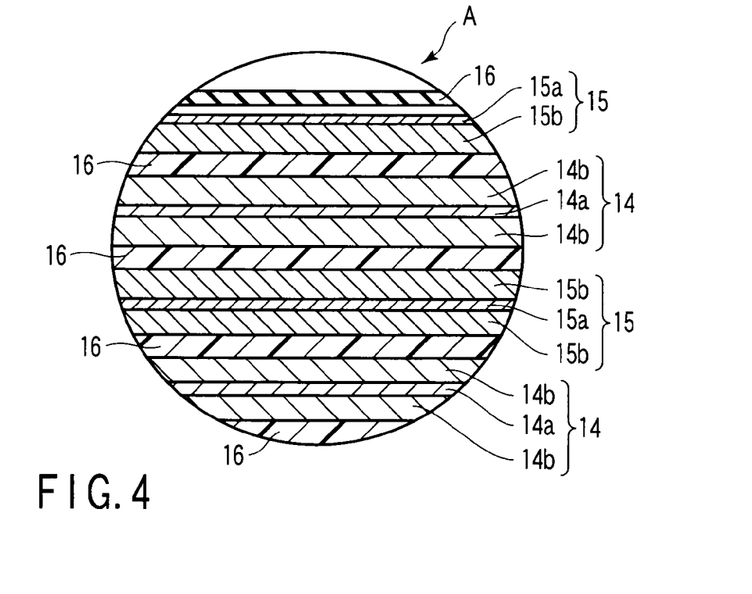
FIG. 4 is an enlarged cross-sectional view illustrating the portion "A" of FIG. 3.

The non-aqueous electrolyte battery (rectangular non-aqueous electrolyte battery) having the aforementioned features will be further explained in detail with reference to FIGS. 3 and 4. FIG. 3 is a partial cross-sectional view illustrating the non-aqueous electrolyte battery according to one embodiment; and FIG. 4 is an enlarged cross-sectional view illustrating the portion "A" of FIG. 3.

To a rectangular cylindrical metal can 11 having a closed bottom and made of aluminum for example is attached, at the opening thereof, a rectangular lid 12 made of aluminum. A flattened electrode group 13 is housed in the rectangular cylindrical metal can 11. This electrode group 13 can be manufactured as follows. Namely, a laminate comprising a positive electrode 14 and a negative electrode 15 with a separator 16 being sandwiched therebetween is spirally wound in such a manner that the outer circumferential surface is occupied by the separator 16 as shown in FIG. 4. This spirally wound body is then press-molded to form the electrode group 13. The positive electrode 14 is constituted for example by a current collector 14a, and a positive electrode active material-containing layer 14b formed on the opposite surfaces of the current collector 14a. A positive electrode lead tab 17 is integrally connected with the current collector 14a of positive electrode 14. The negative electrode 15 is constituted, for example, by a current collector 15a, and a negative electrode active material-containing layer 15b formed on the opposite surfaces of the current collector 15a. A negative electrode lead tab 18 is integrally connected with the current collector 15a. A non-aqueous electrolytic solution is contained in the rectangular cylindrical metal can 11.

A positive electrode terminal 19 having a strip-like configuration, for example, is piercingly attached to the lid 12. The positive electrode lead tab 17 is connected with an end portion of the positive electrode terminal 19 which is disposed inside the rectangular cylindrical metal can 11. A negative electrode terminal 20 having a strip-like configuration, for example, is piercingly attached to the lid 12 by making use of hermetic seal using a glass material 21. The negative electrode lead tab 18 is connected with an end portion of the negative electrode terminal 20 which is disposed inside the rectangular cylindrical metal can 11. Incidentally, the negative electrode terminal 20 may be piercingly attached to the lid 12 by making use of caulking using a resin instead of using a glass material.

Next, the details of aforementioned separator and non-aqueous electrolyte will be explained as follows.

The separator can be used of, for example, a porous film containing an organic macromolecule such as polyethylene (PE), polytetrafluoroethylene (PTFE), polytetrafluoroethylene perfluoroalkoxyethylene (PFA), polyhexafluoropropylene (HFP), polytetrafluoroethylene hexafluoropropylene (FEP), polyethylene tetrafluoroethylene (ETFE), polyethylene terephthalate (PET), polyamide, polyimide, cellulose, cellulose polyethylene or polyvinylidene fluoride (PVdF); unwoven fabrics of synthetic resin; or unwoven fabrics of glass fibers.

The non-aqueous electrolyte is constituted by a non-aqueous solvent, and an electrolytic salt to be dissolved in the non-aqueous solvent. A polymer may be contained in the non-aqueous solvent.

The electrolytic salt can be used lithium salts such as $LiPF_6$, $LiBF_4$, $Li(CF_3SO_2)_2N$ (bistrifluoromethane sulfonylamide lithium; commonly referred to as LiTFSI), $LiCF_3SO_3$ (commonly referred to as LiTFS), $Li(C_2F_5SO_2)_2N$ (bispentafluoroethane sulfonylamide lithium; commonly referred to as LiBETI), $LiClO_4$, $LiAsF_6$, $LiSbF_6$, lithium bisoxalate borate ($LiB(C_2O_4)_2$; commonly referred to as LiBOB), and difluoro(trifluoro-2-oxide-2-trifluoromethyl propionate) lithium borate ($LiBF_2(OCOOC(CF_3)_2)$; commonly referred to as $LiBF_2$(HHIB)). These electrolytic salts may be used singly or in combination of two or more kinds. Especially preferable examples of electrolytic salt are $LiPF_6$ and $LiBF_4$.

A preferable concentration of electrolytic salt is 1.0 to 3 mol/L. When the concentration of electrolytic salt is regulated in this manner, it is possible to enhance the performance of a battery on the occasion of applying a high-load current while suppressing the influence to be caused by the increase of viscosity due to the rise in concentration of electrolytic salt.

Although the non-aqueous solvent is no particular limitation, it may be selected from, for example, propylene carbonate (PC), ethylene carbonate (EC), 1,2-dimethoxy ethane (DME), γ-butyrolactone (GBL), tetrahydrofuran (THF), 2-methyl tetrahydrofuran (2-Me HF), 1,3-dioxorane, sulforane, acetonitrile (AN), diethyl carbonate (DEC), dimethyl carbonate (DMC), methylethyl carbonate (MEC) and dipropyl carbonate (DPC). These solvents can be used singly or in combination of two or more kinds. It is more preferable to use γ-butyrolactone as a non-aqueous solvent if it is desired to attach importance to the thermal stability. Further, as the non-aqueous solvent is required to be excellent in thermal stability and low-temperature performance, it is preferable to use a non-aqueous solvent containing all of three components consisting of EC, PC and GBL. When a non-aqueous solvent containing all three kinds of cyclic carbonate-based solvents (EC, PC and GBL) is used, it can be expected not only high-thermal stability but also the enhancement of low-temperature performance which may be derived concomitant with an increase of entropy. Since cyclic carbonate is higher in viscosity as compared with chain carbonate, it can be remarkably improved the charge/discharge cycle characteristics of a battery when a non-aqueous solvent constituted by cyclic carbonates is employed.

The non-aqueous electrolyte may contain an additive. Although there is no particular limitation with regard to the kind of additive, it can be used, for example, vinylene carbonate (VC), vinylene acetate (VA), vinylene butylate, vinylene hexanate, vinylene crotonate and catechol carbonate. The content of these additives may be 0.1 to 3% by weight, more preferably 0.5 to 1% by weight (both outer percentage) based on the quantity of non-aqueous electrolyte.

The electrode for the non-aqueous electrolyte battery according to the embodiment explained above is capable of remarkably decreasing the internal resistance thereof as compared with the conventional electrode.

That is, since aluminum foil or aluminum alloy foil constituting the current collector is accompanied, on the surface thereof, with a strong oxide film, the interface resistance between the current collector and the active material-containing layer is inevitably caused to increase.

According to the embodiment, the conductive agent comprises the carbon particle group containing the first carbon particles each exhibiting an aspect ratio of more than one, and one of the opposite ends of each first carbon particle extending in the major axial direction is embedded into the current collector to the depth corresponding to 20 to 50% of the thickness of the current collector. As a result, it is possible to realize a so-called high anchoring effect due to the penetration of the first carbon particle into the current collector. For this reason, it is now possible to realize the reduction of the interface resistance between the active material-containing layer and the current collectors, i.e. another factor of the internal resistance of the electrode.

Meanwhile, the conventional electrode is constructed such that the surface of active material is covered with a fine powdery conductive agent such as carbon black. Therefore, the conductive path from the active material to the current collector on the occasion of large current charging/discharging is constituted by a route wherein electric current must pass through the surface of the active material. As a result, the length of the route of the conductive path becomes longer than the shortest distance between the active material and the current collector.

According to the embodiment, the first carbon particles in the carbon particle group of the conductive agent is respectively configured to have a major axis extending 1.05 to 1.50 times as large as the thickness of the active material-containing layer, thereby enabling the first carbon particles to act mainly as a conductive path. For this reason, it is possible to make the length of the route of conductive path more close to the shortest distance between the active material and the current collector as compared with the conventional electrode. As a result, it is now possible to decrease the diffusion resistance in the movement of electrons, i.e. another factor of the internal resistance of the electrode.

Therefore, according to this embodiment, by simply controlling the size of the first carbon particles in the conductive agent constituting one of the components of the active material-containing layer, it can be decreased not only the diffusion resistance in the movement of electrons but also the interfacial resistance between the active material-containing layer and the current collector. As a result, it is no longer required to supply any additional members such as the addition of a conductive layer as required in the case of a conventional electrode. Therefore, it is now possible to obtain an electrode which is useful for the non-aqueous electrolyte battery and capable of minimizing the internal resistance without lowering the effective energy density.

Further, according to this embodiment, since the electrode for a non-aqueous electrolyte battery, which is reduced in internal resistance as described above, is used as the positive electrode and/or the negative electrode of battery, it can be realized a non-aqueous electrolyte battery which is excellent in large current discharging characteristics. Especially, since the value to be obtained from the multiplication of battery resistance [mΩ] by battery capacity [Ah] is confined to less than 10 mΩAh, it is possible to realize a non-aqueous electrolyte battery which is more excellent in large current discharging characteristics.

Next, examples of the present invention will be explained in detail with reference to aforementioned drawings.

EXAMPLE 1

<Manufacture of Positive Electrode>

An active material for a positive electrode formed of $LiCoO_2$ (d50:5.5 μm), a conductive agent constituted by graphite and acetylene black (d50:35 nm), and a binder formed of PVdF were respectively prepared. The graphite employed herein was found as having a particle size distribution of: d50:12 μm and d90:32 μm as measured by means of a laser granulometer. Further, the graphite was found as having an aspect ratio of 3.2 on average as measured by way of image analysis using a scanning electron microscope.

Then, 88 parts by weight of $LiCoO_2$, 3 parts by weight of graphite, 4 parts by weight of acetylene black and 5 parts by weight of PVdF were dispersed in a solvent consisting of N-methylpyrrolidone (NMP) to prepare a slurry. This slurry was then coated on the opposite surfaces of a current collector made of aluminum foil having a thickness of 15 μm and then dried and press-molded to manufacture a positive electrode where an active material-containing layer having a thickness of 28 μm was formed on the opposite surfaces of the current collector.

The cross-section of the positive electrode thus obtained was observed by making use of an electron microscope. As a result, it was possible to confirm the existence of a portion where one end in the longitudinal direction of the graphite having an aspect ratio of more than one was embedded into the current collector formed of aluminum foil to the depth corresponding to 28% at maximum of the thickness of current collector. The length of the major axis of the graphite embedded into the current collector to the depth corresponding to 20 to 28% of the thickness of current collector was 1.09 to 1.32 times as large as the thickness of the active material-containing layer.

The area of the graphite having one end in the longitudinal direction embedded into the current collector to the depth corresponding to 20 to 28% of the thickness of current collector with the other end thereof being extended to reach the surface of active material-containing layer was estimated as existing in the range of $1\times10^4$ to $1\times10^7$ points/m$^2$ of the area of electrode as calculated based on the values of particle size distribution of graphite.

<Manufacture of Negative Electrode>

An active material for a negative electrode formed of $Li_4Ti_5O_{12}$, a conductive agent made of graphite, and a binder formed of PVdF were respectively prepared. The graphite employed herein was found as having a particle size distribution of: d50:19 μm and d90:41 μm as measured by means of laser granulometer. Further, the graphite was found as having an aspect ratio of 3.4 on average as measured by way of image analysis using a scanning electron microscope.

Then, 89 parts by weight of $Li_4Ti_5O_{12}$, 6 parts by weight of graphite and 5 parts by weight of PVdF were dispersed in a solvent consisting of N-methylpyrrolidone (NMP) to prepare a slurry. This slurry was then coated on the opposite surfaces of a current collector made of aluminum foil having a thickness of 15 μm and then dried and press-molded to manufacture a negative electrode where an active material-containing layer having a thickness of 35 μm was formed on the opposite surfaces of the current collector.

The cross-section of the negative electrode thus obtained was observed by making use of an electron microscope. As a result, it was possible to confirm the existence of a portion where one end in the longitudinal direction of the graphite having an aspect ratio of more than one was embedded into the current collector formed of aluminum foil to the depth corresponding to 24% at maximum of the thickness of current collector. The length of the major axis of the graphite embedded into the current collector to the depth corresponding to 20 to 24% of the thickness of current collector was 1.07 to 1.33 times as large as the thickness of the active material-containing layer.

The area of the graphite having one end in the longitudinal direction embedded into the current collector to the depth corresponding to 20 to 24% of the thickness of current collector with the other end thereof being extended to reach the surface of active material-containing layer was estimated as existing in the range of $1\times10^4$ to $1\times10^7$ points/m$^2$ of the area of electrode as calculated based on the value of particle size distribution of graphite.

<Preparation of Non-Aqueous Electrolyte>

2 M of $LiBF_4$ was mixed with a mixed solvent mixed with EC, PC and GBL by the volume ratio of 1:1:4 to prepare a non-aqueous electrolyte.

<Assembling of Battery>

A container formed of a rectangular cylindrical metal can having a closed bottom, and a rectangular lid was prepared. The metal can and the lid were made of aluminum, respectively. A positive electrode terminal was piercingly attached to the lid. A negative electrode terminal was piercingly attached to the lid by making use of caulking using an insulating resin. A separator formed of a polyethylene porous film was impregnated with a non-aqueous electrolyte and then the positive electrode was covered with the separator. Thereafter, the negative electrode was superimposed with the separator being interposed therebetween and the resultant body was spirally wound to manufacture a spirally wound electrode group with a lead tab being extended from the positive electrode and also from the negative electrode. This electrode group was then press-molded to obtain a flattened electrode group. The positive electrode lead tab of the flattened electrode group was connected with one end of the positive electrode terminal of the lid and the negative electrode lead tab thereof was connected with one end of the negative electrode terminal. The electrode group and the lid were concurrently introduced into the interior of the metal can through the opening of the metal can. Then, the lid was welded to the opening of the metal can. As a result of these steps, it was possible to manufacture a rectangular non-aqueous electrolyte battery having a structure as shown in FIG. 1 and a dimension of: 3.0 mm in thickness, 35 mm in width and 62 mm in height.

EXAMPLE 2

A non-aqueous electrolyte battery having the same features as that of Example 1 was manufactured by repeating the same steps as those of Example 1 except that the aluminum foil used as a current collector for the positive electrode was surface-roughened to create a surface area enlarged by about 80 times as compared with a smooth surface.

The cross-section of the positive electrode thus obtained was observed by making use of an electron microscope. As a result, it was possible to confirm the existence of a portion where one end in the longitudinal direction of the carbon particle having the same features as explained in Example 1 was embedded into the current collector formed of aluminum foil to the depth corresponding to 35% at maximum of the thickness of current collector.

The cross-section of the negative electrode thus obtained was observed by making use of an electron microscope. As a result, it was possible to confirm the existence of a portion where one end in the longitudinal direction of the carbon particle having the same features as explained in Example 1 was embedded into the current collector formed of aluminum foil to the depth corresponding to 33% at maximum of the thickness of current collector.

Further, in the positive electrode and the negative electrode, it was estimated that the area of the graphite having one end in the longitudinal direction embedded into the current collector to the depth corresponding to 20 to 35% and 20 to 33% of the thickness of current collector, respectively, and having the other end thereof being extended to reach the surface of active material-containing layer was of the same range as described in Example 1.

EXAMPLE 3

A non-aqueous electrolyte battery having the same features as that of Example 1 was manufactured by repeating the same steps as those of Example 1 except that the slurry used for the manufacture of the positive and negative electrodes was modified such that the quantity of NMP was reduced and the ratio of solid matter was increased by 3% by weight.

The cross-section of the positive electrode thus obtained was observed by making use of an electron microscope. As a result, it was possible to confirm the existence of a portion where one end in the longitudinal direction of the carbon particle having the same features as explained in Example 1 was embedded into the current collector made of aluminum foil to the depth corresponding to 27% at maximum of the thickness of current collector and the other end located opposite to the one end embedded into the current collector was extended to reach the surface of the active material-containing layer.

The cross-section of the negative electrode thus obtained was observed by making use of an electron microscope. As a result, it was possible to confirm the existence of a portion where one end in the longitudinal direction of the carbon particle having the same features as explained in Example 1 was embedded into the current collector made of aluminum foil to the depth corresponding to 33% at maximum of the thickness of current collector and the other end located opposite to said one end embedded into the current collector was extended to reach the surface of the active material-containing layer.

Further, in the positive electrode and the negative electrode, it was estimated that the area of the graphite having one end in the longitudinal direction embedded into the current collector to the depth corresponding to 20 to 27% and 20 to 33% of the thickness of current collector, respectively, and having the other end thereof being extended to reach the surface of active material-containing layer was of the same range as described in Example 1.

EXAMPLE 4

A non-aqueous electrolyte battery having the same features as that of Example 1 was manufactured by repeating the same steps as those of Example 1 except that the graphite having a particle size distribution of: d50:24 μm and d90:56 μm as measured by means of laser granulometer was contained in the conductive agent of the positive electrode, that the thickness of the active material-containing layer of the positive electrode was 52 μm, that the graphite having a particle size distribution of: d50:26 μm and d90:65 μm as measured by means of laser granulometer was contained in the conductive agent of the negative electrode, and that the thickness of the active material-containing layer of the negative electrode was 65 μm. Further, the graphite was found as having an aspect ratio of 3.5 on average as measured by way of image analysis using a scanning electron microscope.

The cross-section of the positive electrode thus obtained was observed by making use of an electron microscope. As a result, it was possible to confirm the existence of a portion where one end in the longitudinal direction of the graphite having an aspect ratio of more than one was embedded into the current collector formed of aluminum foil to the depth corresponding to 25% at maximum of the thickness of current collector. The length of the major axis of the graphite embedded into the current collector to the depth corresponding to 20 to 25% of the thickness of current collector was 1.05 to 1.15 times as large as the thickness of the active material-containing layer. Further, the area of the graphite having one end in the longitudinal direction embedded into the current collector to the depth corresponding to 20 to 25% of the thickness of current collector and having the other end thereof being extended to reach the surface of active material-containing layer was estimated as existing in the range of $1\times10^4$ to $1\times10^7$ points/m$^2$ of the area of the electrode as calculated based on the values of particle size distribution of graphite.

The cross-section of the negative electrode thus obtained was observed by making use of an electron microscope. As a result, it was possible to confirm the existence of a portion where one end in the longitudinal direction of the graphite having an aspect ratio of more than one was embedded into the current collector made of aluminum foil to the depth corresponding to 22% at maximum of the thickness of current collector. The length of the major axis of the graphite embedded into the current collector to the depth corresponding to 20 to 22% of the thickness of current collector was 1.06 to 1.18 times as large as the thickness of the active material-containing layer. Further, the area of the graphite having one end in the longitudinal direction embedded into the current collector to the depth corresponding to 20 to 22% of the thickness of current collector and having the other end thereof being extended to reach the surface of active material-containing layer was estimated as existing in the range of $1\times10^4$ to $1\times10^7$ points/m$^2$ of the area of the electrode as calculated based on the values of particle size distribution of graphite.

EXAMPLE 5

A non-aqueous electrolyte battery having the same features as that of Example 1 was manufactured by repeating the same steps as those of Example 1 except that the graphite contained in the conductive agent of positive electrode was replaced by coke (a particle size distribution of: d50:24 μm and d90:56 μm as measured by means of laser granulometer) and that the graphite contained in the conductive agent of negative electrode was replaced by coke (a particle size distribution of: d50:26 μm and d90:65 μm as measured by means of laser granulometer).

Incidentally, the coke used in the conductive agent of the positive electrode was found as having an aspect ratio of 4.1 on average as measured by way of image analysis using a scanning electron microscope. Further, the coke used in the conductive agent of the negative electrode was found as having an aspect ratio of 4.5 on average as measured by way of image analysis using a scanning electron microscope.

The cross-section of the positive electrode thus obtained was observed by making use of an electron microscope. As a result, it was possible to confirm the existence of a portion where one end in the longitudinal direction of the carbon particle was embedded into the current collector formed of aluminum foil to the depth corresponding to 27% at maximum of the thickness of the current collector. The length of the major axis of the graphite embedded into the current collector to the depth corresponding to 20 to 27% of the thickness of current collector was 1.10 to 1.50 times as large as the thickness of the active material-containing layer. Further, the area of the graphite having one end in the longitudinal direction embedded into the current collector to the depth corresponding to 20 to 27% of the thickness of current collector and having the other end thereof being extended to reach the surface of active material-containing layer was estimated as existing in the range of $2\times10^4$ to $2\times10^7$ points/m$^2$ of the area of electrode as calculated based on the values of particle size distribution of graphite.

The cross-section of the negative electrode thus obtained was observed by making use of an electron microscope. As a result, it was possible to confirm the existence of a portion where one end in the longitudinal direction of the graphite having an aspect ratio of more than one was embedded into the current collector formed of aluminum foil to the depth corresponding to 25% at maximum of the thickness of the current collector. The length of the major axis of the graphite embedded into the current collector to the depth corresponding to 20 to 25% of the thickness of current collector was 1.12 to 1.48 times as large as the thickness of the active material-containing layer. Further, the area of the graphite having one end in the longitudinal direction embedded into the current collector to the depth corresponding to 20 to 25% of the thickness of current collector and having the other end thereof being extended to reach the surface of active material-containing layer was estimated as existing in the range of $2\times10^4$ to $2\times10^7$ points/m$^2$ of the area of electrode as calculated based on the values of particle size distribution of graphite.

EXAMPLE 6

A non-aqueous electrolyte battery having the same features as that of Example 1 was manufactured by repeating the same steps as those of Example 1 except that the graphite having a particle size distribution of: d50:12 μm and d90:32

μm as measured by means of laser granulometer was contained in the conductive agent of negative electrode. Incidentally, the graphite employed for forming the conductive agent of the negative electrode was found as having an aspect ratio of 3.0 on average as measured by way of image analysis using a scanning electron microscope.

The cross-section of the negative electrode thus obtained was observed by making use of an electron microscope. As a result, it was possible to confirm the existence of a portion where one end in the longitudinal direction of the graphite having a major axis length of 0.94 time as large as the thickness of the active material-containing layer was embedded into the current collector made of aluminum foil to the depth corresponding to 1% at maximum of the thickness of current collector.

EXAMPLE 7

A non-aqueous electrolyte battery having the same features as that of Example 1 was manufactured by repeating the same steps as those of Example 1 except that the graphite having a particle size distribution of: d50:9 μm and d90:20 μm as measured by means of laser granulometer was contained in the conductive agent of positive electrode. Incidentally, the graphite used of the conductive agent of the negative electrode was found as having an aspect ratio of 3.1 on average as measured by way of image analysis using a scanning electron microscope.

The cross-section of the positive electrode thus obtained was observed by making use of an electron microscope. As a result, it was possible to confirm the existence of a portion where one end in the longitudinal direction of the graphite having a major axis length of 0.75 times as large as the thickness of the active material-containing layer was embedded into the current collector made of aluminum foil to the depth corresponding to 2% at maximum of the thickness of current collector.

EXAMPLE 8

A non-aqueous electrolyte battery having the same features as that of Example 1 was manufactured by repeating the same steps as those of Example 1 except that the slurry employed for the manufacture of the positive electrode was modified such that the quantity of NMP was increased as compared with Example 1 and the ratio of solid matters was increased by 20% as compared with Example 1.

The cross-section of the positive electrode thus obtained was observed by making use of an electron microscope. As a result, a portion of graphite which was different from one end in the major axial direction thereof was embedded into the current collector formed of aluminum to a depth of 22% at maximum of the thickness of current collector. Further, it was possible to confirm the existence of the other end portion of graphite (located opposite to the aforementioned one end thereof) which was extended up to the surface of the active material-containing layer.

EXAMPLE 9

A non-aqueous electrolyte battery having the same features as that of Example 1 was manufactured by repeating the same steps as those of Example 1 except that the graphite having a particle size distribution of: d50:9 μm and d90:30 μm as measured by means of laser granulometer was used as the conductive agent of positive electrode. The cross-section of the positive electrode thus obtained was observed by making use of an electron microscope. As a result, one end portion in the direction of major axis of graphite was embedded into the current collector formed of aluminum to a depth of 24% at maximum of the thickness of current collector. Further, it was possible to confirm the existence of the other end portion of graphite which was located a height of 5 μm from the surface of the active material-containing layer.

COMPARATIVE EXAMPLE 1

A non-aqueous electrolyte battery having the same features as that of Example 1 was manufactured by repeating the same steps as those of Example 1 except that the graphite having a particle size distribution of: d50:9 μm and d90:20 μm as measured by means of laser granulometer was contained in the conductive agent of positive electrode, and that the graphite having a particle size distribution of: d50:12 μm and d90: 32 μm as measured by means of laser granulometer was contained in the conductive agent of negative electrode. Incidentally, the graphite used for forming the conductive agent of the positive electrode was found as having an aspect ratio of 3.1 on average as measured by way of image analysis using a scanning electron microscope. Further, the graphite used of the conductive agent of the negative electrode was found as having an aspect ratio of 3.0 on average as measured by way of image analysis using a scanning electron microscope.

The cross-section of the positive electrode thus obtained was observed by making use of an electron microscope. As a result, it was possible to confirm the existence of a portion where one end in the longitudinal direction of the graphite having a major axis length of at most 0.75 times as large as the thickness of the active material-containing layer was embedded into the current collector made of aluminum foil to the depth corresponding to 2% at maximum of the thickness of current collector.

The cross-section of the negative electrode thus obtained was observed by making use of an electron microscope. As a result, it was possible to confirm the existence of a portion where one end in the longitudinal direction of the graphite having a major axis length of 0.94 times as large as the thickness of the active material-containing layer was embedded into the current collector made of aluminum foil to the depth corresponding to 1% at maximum of the thickness of current collector.

COMPARATIVE EXAMPLE 2

A non-aqueous electrolyte battery having the same features as that of Example 1 was manufactured by repeating the same steps as those of Example 1 except that the aluminum foil used as a current collector for the positive electrode was surface-roughened to create a surface area enlarged by about 80 times as compared with a smooth surface.

The cross-section of the positive electrode thus obtained was observed by making use of an electron microscope. As a result, it was possible to confirm the existence of a portion where one end in the longitudinal direction of the graphite having the same features as described in Comparative Example 1 and a major axis length of at most 0.75 times as large as the thickness of the active material-containing layer was embedded into the current collector made of aluminum foil to the depth corresponding to 12% at maximum of the thickness of current collector.

The cross-section of the negative electrode thus obtained was observed by making use of an electron microscope. As a result, it was possible to confirm the existence of a portion where one end in the longitudinal direction of the graphite having the same features as described in Comparative Example 1 and a major axis length of 0.94 times as large as the thickness of the active material-containing layer was embedded into the current collector made of aluminum foil to the depth corresponding to 11% at maximum of the thickness of current collector.

COMPARATIVE EXAMPLE 3

A non-aqueous electrolyte battery having the same features as that of Example 1 was manufactured by repeating the same steps as those of Example 1 except that the graphite having a particle size distribution of: d50:18 μm and d90:45 μm as measured by means of laser granulometer was contained in the conductive agent of positive electrode, that the thickness of the active material-containing layer of the positive electrode was 52 μm, that the graphite having a particle size distribution of: d50:20 μm and d90:50 μm as measured by means of laser granulometer was contained in the conductive agent of negative electrode, and that the thickness of the active material-containing layer of the negative electrode was 65 μm. Incidentally, the graphite used of the conductive agent of the positive electrode was found as having an aspect ratio of 3.2 on average as measured by way of image analysis using a scanning electron microscope. Further, the graphite used of the conductive agent of the negative electrode was found as having an aspect ratio of 3.6 on average as measured by way of image analysis using a scanning electron microscope.

The cross-section of the positive electrode thus obtained was observed by making use of an electron microscope. As a result, it was possible to confirm the existence of a portion where one end in the longitudinal direction of the graphite was embedded into the current collector made of aluminum foil to the depth corresponding to 1% at maximum of the thickness of current collector.

The cross-section of the negative electrode thus obtained was observed by making use of an electron microscope. As a result, it was possible to confirm the existence of a portion where one end in the longitudinal direction of the graphite was embedded into the current collector made of aluminum foil to the depth corresponding to 1% at maximum of the thickness of current collector.

With respect to the non-aqueous electrolytic batteries obtained in Examples 1 to 7 and Comparative Examples 1 to 3, the electric resistance thereof at 50% in depth of charge was measured according to the following method.

Namely, the non-aqueous electrolyte battery was charged to bring it into a fully charged state, and then allowed to discharge to half of the battery capacity, thus bringing the depth down to 50%. Then, the discharging was performed for 0.2 seconds at 0.2 C electric current $I_{0.2}[A]$ and the voltage $E_1[V]$ at this moment was read out. After the battery was brought into a state of open circuit for one minute, the charging of battery was performed for 0.2 seconds at 0.2 C of battery capacity. Additionally, after the battery was brought into a state of open circuit for one minute, the discharging of battery was performed for 0.2 seconds at 10 C electric current $I_{10}[A]$ of battery capacity and the voltage $E_2[V]$ at this moment was read out. Then, the battery resistance was determined by introducing the values of the electric current and voltage into the following formula (4).

$$\text{Battery resistance } [\Omega] = (E_1 - E_2)/(I_{10} - I_{0.2}) \qquad (4)$$

Further, the output of each of the non-aqueous electrolytic batteries obtained in Examples 1 to 7 and Comparative Examples 1 to 3 was measured according to the following method.

Namely, after the battery was discharged so as to bring it into a state where the depth of charge was brought down to 50% in the same manner as conducted on the occasion of measuring the battery resistance, the discharging was performed for 10 seconds with an electric current of 1 C and the voltage $E_a[V]$ at this moment was measured. After the charging for capacity compensation was performed, the discharging was performed for 10 seconds with an electric current of 10 C and the voltage $E_b[V]$ at this moment was measured. Based on the results thus obtained, a current-voltage correlation diagram was created and the value of electric current $I_a[A]$ at the time when the battery voltage reached 1V was calculated by way of extrapolation and the resultant value was introduced into the following formula (5).

$$\text{Output } [W] = I[V] \times I_a[A] \qquad (5)$$

The values of electric resistance and output of each of the non-aqueous electrolytic batteries obtained in Examples 1 to 7 and Comparative Examples 1 to 3 are shown in the following Table 1. Table 1 also shows the thickness of the active material-containing layers of the positive and negative electrodes, and the maximum depth of embedding of graphite or coke in the current collector in the positive and negative electrodes (hereinafter referred to simply as "the maximum depth of embedding of carbon particle in the current collector").

TABLE 1

| | Positive electrode | | Negative electrode | | | |
|---|---|---|---|---|---|---|
| | Thickess of active material-containing layer (μm) | Maximum depth of embedded first carbon particles in current collector (%) | Thickness of active material-containing layer (μm) | Maximum depth of embedded first carbon particles in current collector (%) | Battery resistance (mΩ) | Output (W) |
| Example 1 | 28 | 28 | 35 | 27 | 5.0 | 75 |
| Example 2 | 28 | 35 | 35 | 33 | 4.8 | 90 |
| Example 3 | 28 | 27 | 35 | 33 | 5.0 | 80 |
| Example 4 | 52 | 25 | 65 | 22 | 15.1 | 61 |
| Example 5 | 28 | 27 | 35 | 25 | 5.2 | 70 |
| Example 6 | 28 | 28 | 35 | 1 | 5.1 | 65 |
| Example 7 | 28 | 2 | 35 | 27 | 5.2 | 66 |
| Example 8 | 28 | 22 | 35 | 27 | 5.3 | 68 |
| Example 9 | 28 | 24 | 35 | 27 | 5.3 | 69 |
| Comparative Example 1 | 28 | 2 | 35 | 1 | 5.1 | 58 |
| Comparative Example 2 | 28 | 12 | 35 | 11 | 4.9 | 60 |

TABLE 1-continued

|  | Positive electrode | | Negative electrode | | | |
| --- | --- | --- | --- | --- | --- | --- |
|  | Thickness of active material-containing layer (μm) | Maximum depth of embedded first carbon particles in current collector (%) | Thickness of active material-containing layer (μm) | Maximum depth of embedded first carbon particles in current collector (%) | Battery resistance (mΩ) | Output (W) |
| Comparative Example 3 | 52 | 1 | 65 | 1 | 15.2 | 51 |

As apparent from Table 1, it would be clear from the comparison between Examples 1 and 2 and Comparative Example 1 that the batteries of Examples 1 and 2, in which the conductive agent contained in the active material-containing layer of the positive and negative electrodes was constructed such that it contained carbon particles (graphite or coke) each exhibiting an aspect ratio of more than one, that one of the opposite ends of each carbon particle extending in the major axial direction was embedded into the current collector made of aluminum foil to the depth corresponding to 20 to 50% of the thickness of the current collector and that the length of the major axis thereof was 1.05 to 1.50 times as large as the thickness of the active material-containing layer, were capable of enhancing the output characteristics as compared with the battery of Comparative Example 1 in which carbon particles were contained in the current collector in such a manner that the depth of embedding of carbon particles into the current collector was relatively shallow or the length of the major axis was relatively short as compared with the carbon particles of Examples 1 and 5.

It is also clear from the comparison between Example 1 and Example 2 that the battery of Example 2, in which surface-roughened aluminum foil was used as the current collector, was lower in electric resistance and higher in output as compared with the battery of Example 1.

It is also clear from the comparison between Example 1 and Example 3 that the battery of Example 3, in which the other end of a carbon particle located opposite to the aforementioned one end of carbon particle which was embedded into the current collector was extended to reach the surface of the active material-containing layer, was lower in electric resistance and higher in output as compared with the battery of Example 1.

It is also clear from the comparison between the relationship of Example 1 with Comparative Example 1 (wherein the thickness of the active material-containing layer of the positive electrode and the thickness of the active material-containing layer of the negative electrode were 28 μm and 35 μm, respectively) and the relationship of Example 4 with Comparative Example 3 (wherein the thickness of the active material-containing layer of the positive electrode and the thickness of the active material-containing layer of the negative electrode were 52 μm and 65 μm, respectively), that the batteries wherein the value of (battery resistance) [mΩ]×(battery capacity) [Ah] was confined to less than 10[mΩAh] were higher in output.

It will be recognized from the comparison between Examples 1 and 8 and Comparative Example 1 that although one end portion in the direction of major axis of carbonaceous particle should preferably be embedded into the current collector in order to enhance the output of the battery, even if one end portion of the carbonaceous particle, which is excluded an end portion in the direction of major axis thereof, is embedded into the current collector, it is possible to obtain almost the same effects.

It will be recognized from the comparison between Examples 1 and 9 and Comparative Example 1 that although other end portion of carbonaceous particle should preferably be extended up to the surface of the active material-containing layer, as long as other end portion of carbonaceous particle is located a height of 5 μm from the surface of the active material-containing layer, it is possible to realize almost the same degree of enhancement in output of the battery.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electrode for non-aqueous electrolyte battery, comprising:
   a current collector formed of aluminum foil or aluminum alloy foil; and
   an active material-containing layer formed on a surface of the current collector and containing an active material, a conductive agent and a binder,
   wherein the conductive agent comprises a carbon particle group containing first carbon particles each exhibiting an aspect ratio of more than one,
   a portion of each of the first carbon particles is embedded into the current collector to the depth corresponding to 20 to 50% of the thickness of the current collector, and
   a major axis of each of the first carbon particles has a length of 1.05 to 1.50 times as large as the thickness of the active material-containing layer.

2. The electrode according to claim 1, wherein the aspect ratio of the first carbon particles is 1.5 to 100.

3. The electrode according to claim 1, wherein the depth in which the portion of each of the first carbon particles is embedded into the current collector is the range of 20 to 40% of the thickness of the current collector.

4. The electrode according to claim 1, wherein the major axis each of the first carbon particles has a length of 1.10 to 1.45 times as large as the thickness of the active material-containing layer.

5. The electrode according to claim 1, wherein the portion of each of the first carbon particles embedded into the current collector includes one of the opposite ends of each of first carbon particles extending in the major axial direction.

6. The electrode according to claim 1, wherein a portion located opposite to the portion in which each of the first carbon particles is embedded into the current collector, is extended up to the surface of the active material-containing layer.

7. The electrode according to claim 1, wherein the portion of each of the first carbon particles includes one of the opposite ends of each of first carbon particles extending in the major axial direction, and other of the opposite ends of each of first carbon is extended up to the surface of the active material-containing layer.

8. The electrode according to claim 1, wherein a portion located opposite to the portion in which each of the first carbon particles is embedded into the current collector, is located within a region defined by the surface of the active material-containing layer and by a plane away from the surface of the active material-containing layer by a distance corresponding to an average particle diameter of the active material.

9. The electrode according to claim 1, wherein the carbon particle group further comprises second carbon particles each having an aspect ratio of more than one, and one of the opposite ends of each of the second carbon particles extending in the major axial direction being embedded into the current collector to the depth corresponding to less than 20% of the thickness of the current collector, or being not embedded into the current collector.

10. The electrode according to claim 1, wherein the conductive agent comprises the carbon particle group, and carbon powder which is finer in size as compared with the first carbon particles.

11. The electrode according to claim 10, wherein the carbon particle group is graphite or coke, and the carbon powder is carbon black.

12. The electrode according to claim 10, wherein the conductive agent comprises 30 to 60% by weight of the carbon particle group and 40 to 70% by weight of the carbon powder.

13. The electrode according to claim 1, wherein the surface of the current collector on which the active material-containing layer is formed, is surface-roughened.

14. The electrode according to claim 13, wherein the magnification of surface-roughening in the current collector is 10 to 120 times.

15. The electrode according to claim 1, wherein the electrode is positive electrode, and an active material for the positive electrode being selected from lithium nickel composite oxide, lithium cobalt composite oxide, lithium nickel cobalt composite oxide, lithium manganese nickel composite oxide, spinel type lithium manganese nickel composite oxide, lithium manganese cobalt composite oxide, or lithium iron phosphate.

16. The electrode according to claim 1, wherein the electrode is negative electrode, and an active material for the negative electrode being selected from lithium titanium oxide or metallic composite oxides containing Ti and at least one element selected from the group consisting of P, V, Sn, Cu, Ni and Fe.

17. A non-aqueous electrolyte battery which comprises a positive electrode and a negative electrode, at least one selected from the group consisting of the positive electrode and the negative electrode being the electrode for non-aqueous electrolyte battery as defined in claim 1.

18. The battery according to claim 17, wherein an active material for the positive electrode is selected from lithium nickel composite oxide, lithium cobalt composite oxide, lithium nickel cobalt composite oxide, lithium manganese nickel composite oxide, spinel type lithium manganese nickel composite oxide, lithium manganese cobalt composite oxide, or lithium iron phosphate.

19. The battery according to claim 17, wherein an active material for the negative electrode is selected from lithium titanium oxide or metallic composite oxides containing Ti and at least one element selected from the group consisting of P, V, Sn, Cu, Ni and Fe.

20. The battery according to claim 17, wherein a value to be obtained from the multiplication of battery resistance [mΩ] by battery capacity [Ah] is less than 10 mΩAh.

* * * * *